United States Patent [19]
Ramesh

[11] Patent Number: 5,642,384
[45] Date of Patent: Jun. 24, 1997

[54] TRELLIS CODED MODULATION SCHEME WITH LOW ENVELOPE VARIATION FOR MOBILE RADIO BY CONSTRAINING A MAXIMUM MODULUS OF A DIFFERENTIAL PHASE ANGLE

[75] Inventor: Rajaram Ramesh, Schenectady, N.Y.

[73] Assignee: Ericsson Inc., Research Triangle Park, N.C.

[21] Appl. No.: 86,798

[22] Filed: Jul. 6, 1993

[51] Int. Cl.$^6$ .................................................. H04L 27/10
[52] U.S. Cl. ........................... 375/265; 375/283; 375/298; 375/308; 332/103; 332/144
[58] Field of Search .................................. 375/52, 53, 54, 375/56, 94, 67, 279, 280, 298, 281, 283, 340, 308; 371/43; 332/103, 144

[56] References Cited

U.S. PATENT DOCUMENTS

| | | | |
|---|---|---|---|
| 4,817,116 | 3/1989 | Akaiwa et al. | 375/276 |
| 5,311,552 | 5/1994 | Chennakeshu et al. | 375/265 |
| 5,311,553 | 5/1994 | Chennakeshu et al. | 375/265 |
| 5,600,676 | 2/1997 | Ramesh | 375/265 |

OTHER PUBLICATIONS

Electronics And Communications In Japan, vol. 65, No. 8, Aug. 1982, Takahiro Yamada et al, "A Method Of Coding For Correlative Transmission Systems . . . Modulation System".

42nd Vehicular Technology Society (VTS) Conference, May 10-13, 1992, Denver, Colorado, vol. 2, pp. 856–859, Chenakeshu et al, "Improving ACIPR For Land Mobile . . . Coded Modulation".

"Introduction to Trellis–Coded Modulation with Applications", Biglieri et al, p. 411, line 12–19.

IEEE Global Telecommunications Conference, Dec. 6–9, 1992, Orlando, Florida, vol. 3, pp. 1807–1812 "Trellis Coding Of PI/4–QPSK Signals for AWGN and Fading Channels", Ho et al.

U.S. Patent Application "A Modulation Scheme with Low Envelope Variation for Mobile Radio" by Rajaram Ramesh (Atty. Docket No. RD–22,412) filed concurrently with this application.

U.S. Patent Application "Trellis Coding Technique to Improve ACIPR in Land Mobile Radio Systems Under Peak Power Constraints" by Sandeep Chennakeshu, Amer A. Hassan and John B. Anderson Ser. No. 07/898,670, filed Jun. 15, 1992 (Attorney Docket No. RD–21,622).

U.S. Patent Application "Improved Trellis Coding Technique to Increase Adjacent Channel Interference Protection Ratio in Land Mobile Radio Systems Under Peak Power Constraints" by Sandeep Chennakeshu, Rajaram Ramesh, Amer A. Hassan, John B. Anderson, Ser. No. 07/975,201, filed Jun. 12, 1992 (Attorney Docket No. RD–22,127).

(List continued on next page.)

Primary Examiner—Wellington Chin
Assistant Examiner—William Luther
Attorney, Agent, or Firm—Nixon & Vanderhye P.C.

[57] ABSTRACT

A digital radio communication system employs an encoder for creating a set of encoded bits for each set of input bits. A mapper in the transmitter employs a modulation scheme which is constrained in the maximum phase angle difference between subsequently transmitted symbols. A constellation having a number of redundant symbols within the constrained maximum phase angle is chosen. An iterative search is performed to assign each of these symbols to a set of encoded bits such that the resultant coded scheme provides optimal bit error rate (BER) performance for the channel type. Configuring the encoder and mapper in this manner reduces the transmitted power envelope variation of the transmitted signal, thereby reducing the linearity requirements on a transmitter amplifier. Since transmitted power envelope variation is reduced, battery life of a mobile unit is extended. This manner of configuration also retains significant separation between transmitted sequences, resulting in substantial resistance to interference.

17 Claims, 11 Drawing Sheets

OTHER PUBLICATIONS

"Highly Efficient Digital Mobile communications with a Linear Modulation Method" by Y. Akaiwa and Y. Nagata, IEEE Journal of Sel. Areas in Commun., vol. SAC-5 No. 5, p. 890, Jun. 1987.

"Introduction to Trellis–coded Modulation with Applications", Biglieri, et al pp 399–401, ch. 9, Analysis and Performance of TCM for Fading Channels.

"Computer Programs: Design Technique", Appendix C. pp. 527–539.

TRELLIS CODED MODULATION SCHEME WITH LOW ENVELOPE VARIATION FOR MOBILE RADIO BY CONSTRAINING A MAXIMUM MODULUS OF A DIFFERENTIAL PHASE ANGLE

CROSS REFERENCES TO RELATED APPLICATIONS

This application is related to U.S. Patent applications "A Modulation Scheme with Low Envelope Variation for Mobile Radio" by Rajaram Ramesh (Atty. Docket No. RD-22,412) Ser. No. 08/086,797, now U.S. Pat. No. 5,600,676, filed concurrently with this application; "Trellis Coding Technique to Improve ACIPR in Land Mobile Radio Systems Under Peak Power Constraints" by Sandeep Chennakeshu, Amer A. Hassan and John B. Anderson Ser. No. 07/898,670, filed Jun. 15, 1992, now U.S. Pat. No. 5,311,552; and "Improved Trellis Coding Technique to Increase Adjacent Channel Interference Protection Ratio in Land Mobile Radio Systems Under Peak Power Constraints" by Sandeep Chennakeshu, Rajaram Ramesh, Amer A. Hassan, John B. Anderson, Ser. No. 07/975,201, filed Jun. 12, 1992, now U.S. Pat. No. 5,311,553; all assigned to the present assignee and hereby incorporated by reference.

BACKGROUND OF THE INVENTION

1. Field of the Invention

This invention relates to land mobile radio systems and more specifically to a method for minimizing adjacent channel interference by constraining transmitted power envelope variations for mobile radio systems without sacrificing transmitted range.

2. Description of Related Art

Conventional land mobile radio (LMR) channels employ narrow-band frequency division multiplexed (FDMA) systems for base stations to communicate with mobile radio units. Each base unit/mobile unit communicating pair employs a different frequency band.

Speech communication may be executed by digitizing the speech, and transmitting the encoded speech information. Other digital information may be desired to be communicated between a base and mobile radio unit.

Currently, there is an immediate need for an increase in capacity of LMR systems in the U.S. for such applications as public safety trunking. The trend is to increase capacity by splitting each existing 25 KHz channel used in LMR systems into two 12.5 KHz channels. However, this causes adjacent channel interference (ACI). ACI is interference introduced at a receiver from a transmitter broadcasting at a frequency corresponding to an adjacent channel and is sometimes called adjacent channel 'splatter'. This interference is increased by intermodulation and harmonic distortions caused by non-linearities in the radio frequency (RF) amplifier in the transmitter.

The need for capacity in land mobile radio (LMR) systems can be met by improving spectral efficiency (to values greater than 1 bit/sec/Hz). However, the achievable spectral efficiency is limited by stringent adjacent-channel interference protection specifications.

Continuous phase modulation (CPM) schemes such as 4-level digital FM can meet the current adjacent channel interference protection ratio (ACIPR) requirements for LMR and also exhibit acceptable distortions from a non-linear RF amplifier. However, these schemes offer inadequate spectral efficiency (0.75 bits/sec/Hz) to meet future increases in capacity.

Linear modulation, such as π/4-shifted differential quadrature phase shift keying (DQPSK), offers higher spectral efficiency than constant envelope CPM schemes but requires highly linear RF amplifiers to suppress ACI. The requirement of a linear RF amplifier arises due to high envelope variations exhibited by π/4-shifted DQPSK. Filtered π/4-shifted DQPSK offers an ACIPR of approximately 40–45 dB with a linearized conventional class-AB power amplifier as described in "Highly Efficient Digital Mobile communications with a Linear Modulation Method" by Y. Akaiwa and Y. Nagata, IEEE Journal of Sel. Areas in Commun., vol SAC-5 no. 5, pp. 890, June 1987 and U.S. Patent Application, "Improved Trellis Coding Technique to Increase Adjacent Channel Interference Protection Ratio in Land Mobile Radio Under Peak Under Peak Power Constraints", by S. Chennakeshu, et al, Ser. No. 07/975,201 filed Jun. 15, 1992.

The above comparison of constant envelope and linear modulation schemes is based on power and bandwidth occupancy. However, it is also important to address decoding complexity for the two schemes. While linear modulation schemes require amplifier linearization, these schemes are easier to synchronize and equalize for intersymbol interference (ISI) relative to continuous phase modulation schemes.

A related problem is that improved spectral efficiency and ACIPR are typically achieved at the expense of power and hence result in range reduction. The range reduction can be quite a problem where the area over which the base unit and mobile unit communicate is very large. An increased transmission area implies increased cost and complexity at the base station. A range equivalent to the existing analog FM system is desired. The transmission range is directly related to the acceptable bit error rate (BER) for a given signal-to-noise ratio.

There is a need for a digital mobile radio system employing a linear modulation scheme which meets the stringent ACIPR specifications with relaxed linearity requirements on the RF amplifier, and exhibits an improved transmission range.

OBJECTS OF THE INVENTION

An object of the invention is to provide a linear modulation scheme which reduces linearity requirements of the transmitter amplifier while providing superior range relative to conventional systems.

Another object of the present invention is to provide a digital radio communication system employing a linear modulation scheme with low envelope variation and lower power consumption requirements thereby resulting in increased battery life.

Another object of the invention is to provide a communication system having a higher average transmitted power resulting in a lower bit error rate (BER) performance at a given range and maximum transmitted power as compared with a conventional communication system.

Another object of the invention is to provide a method of communication having decreased envelope variation and lower BER relative to conventional techniques.

Another object of the present invention is to provide a method of data transmission having a low transmitted power envelope variation which allows for interleaving of transmitted symbols.

SUMMARY OF THE INVENTION

A method of configuring a digital radio transmitter having an encoder and mapper starts with selecting an encoder capable of being in a plurality of encoder states, the encoder capable of providing a set of encoded bits for each set of input bits.

A maximum allowable phase angle transition for a symbol transmission, and a set of constellation symbols within the maximum constrained angle Θ are selected. The mapper is configured to provide an assigned symbol when provided a set of encoder bits.

A generator polynomial for the encoder is selected. All possible encoder state transitions (paths) over a predetermined number of symbol transitions are permutated. The paths which have the same initial and final states are referred to as closed paths. A metric is determined which measures distance between all possible pairs of closed paths. This metric may be a Euclidian distance for an added white Gaussian channel, and Hamming distance for a fading channel. The minimum distance is determined between the two closest closed paths for each generator polynomial. The minimum distance is then determined between the two closest closed paths for all other generator polynomials.

A generator polynomial having the largest minimum distance is chosen, and the encoder is configured to encode subsequent data to result in a transmitted signal having reduced envelope variation and maximum distance between subsequent transmitted symbols.

For fading channels, there may be several generator polynomials which share the largest minimum Hamming distance. In this case, the following process is repeated only for paths exhibiting the largest minimum Hamming distance. A product metric is employed with these paths to determine the minimum product distance between all possible pairs of remaining paths for each of the remaining generator polynomials, and the generator polynomial having the largest minimum product distance is chosen.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawing in which:

DETAILED DESCRIPTION OF THE INVENTION

Figure 1:
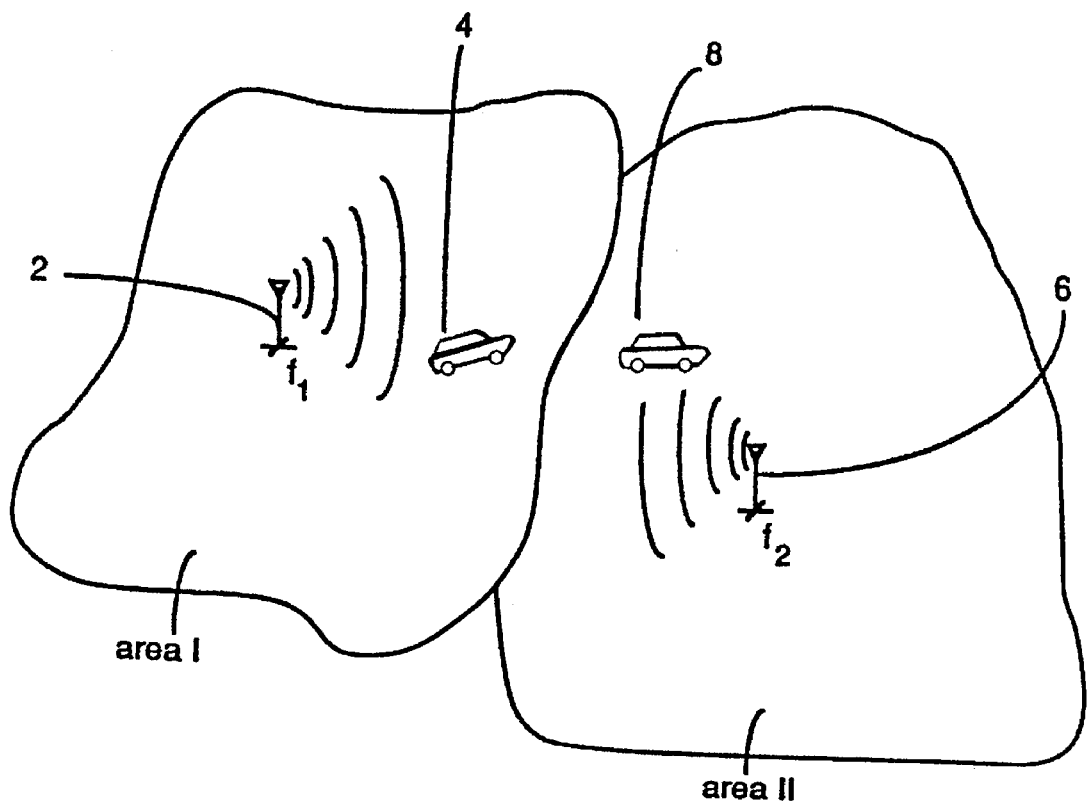
FIG. 1 is an illustration of two digital radio systems communicating in geographically adjacent areas using adjacent frequency bands.

Typically, in land mobile radio (LMR) systems, contiguous geographic areas permit use of spectrally adjacent channels. In FIG. 1, area I and area II are geographically adjacent regions. An LMR base unit 2 communicates with mobile unit 4 at a frequency $f_1$. Similarly, an LMR base unit 6 communicates with a mobile unit 8 at a frequency $f_2$.

Figure 2:
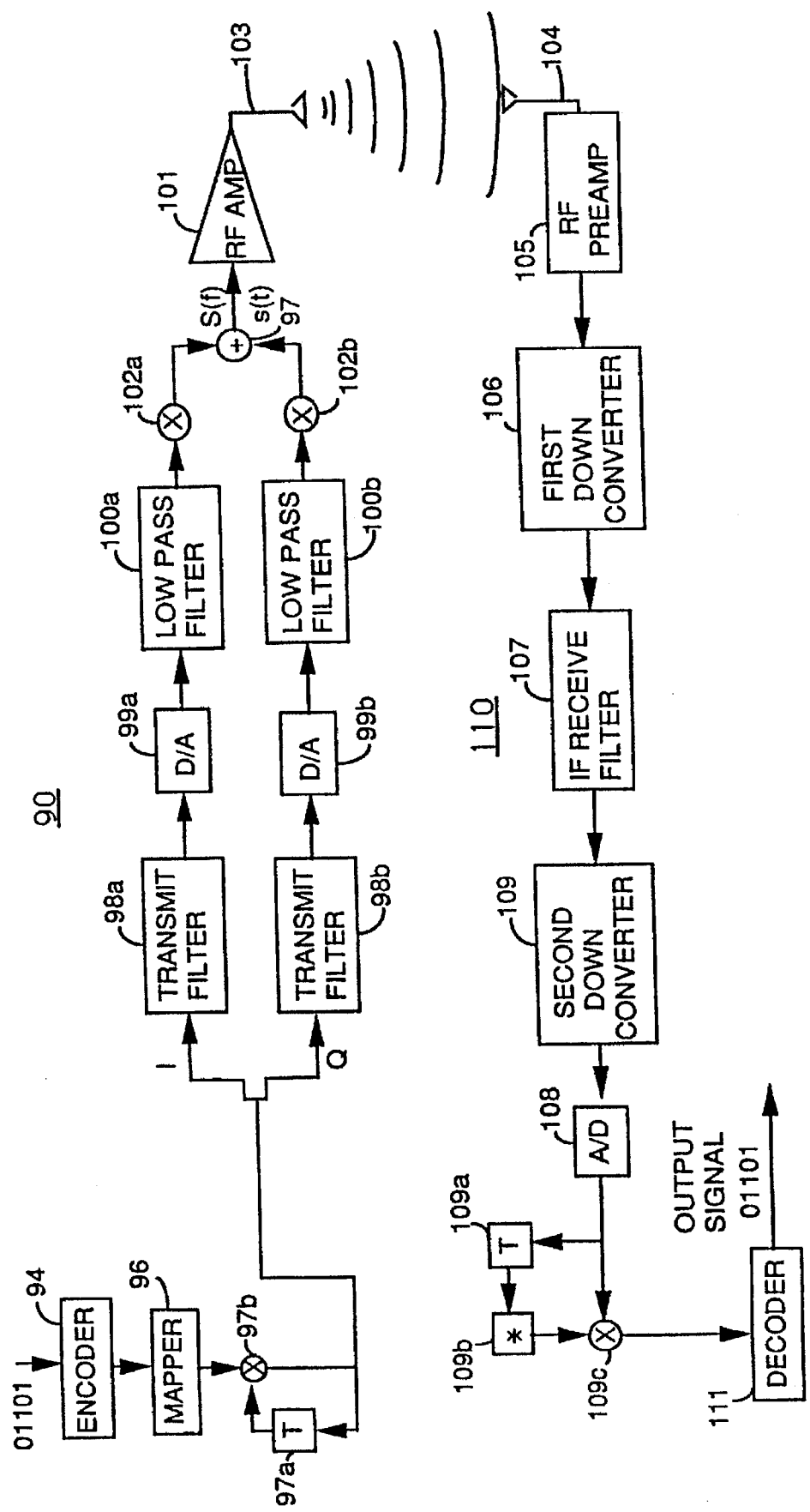
FIG. 2 is a simplified block diagram of a first embodiment of a communication system employing the present invention.

A simplified block diagram of a digital radio system capable of employing the coding scheme of the present invention is shown in FIG. 2. Digital information desired to be transmitted is introduced into an encoder 94 of a transmitter 90. The digital information may be from a digital source or an analog signal which has been digitized (in the case of digitized speech). Encoder 94 transforms the digital information to an encoded signal which is passed to a mapper 96. Mapper 96 maps the encoded signal onto a symbol of a signal constellation. (A delay circuit 97a and a multiplier 97b act to create a difference between a present symbol and the subsequent symbol in the case of differential phase encoding.) This signal may be represented by its in-phase (I) and quadrature (Q) components which are passed through parallel processing branches. Each of these signals is passed through transmit filters 98a, 98b, D/A converters 99a, 99b, and low pass filters 100a, 100b, and is frequency shifted by quadrature modulators 102a, 102b and finally mixed by a summer 97. The signal from summer 97 is then sent to an RF amplifier 101 which increases the gain of the signal. The RF amplifier passes the amplified signal to an antenna 103 which transmits to a second antenna 104 at a remote receiver 110. The received signal is passed through an RF preamplifier 105 to a first down converter 106 which reduces the frequency of the received signal in the MHz. range to an intermediate frequency signal in the kHz. range. The intermediate frequency signal is passed to an intermediate frequency receive filter 107, then through a second down converter 109 to produce a filtered baseband signal. The filtered baseband signal is digitized by an analog-to-digital converter 108, then differentially demodulated employing a delay element 109a and phase inverter 109b and multiplier 109c. It is then passed to a decoder 111 which processes the digitized baseband signal to recover the transmitted signal information according to the method in which it was first encoded.

Figure 3:
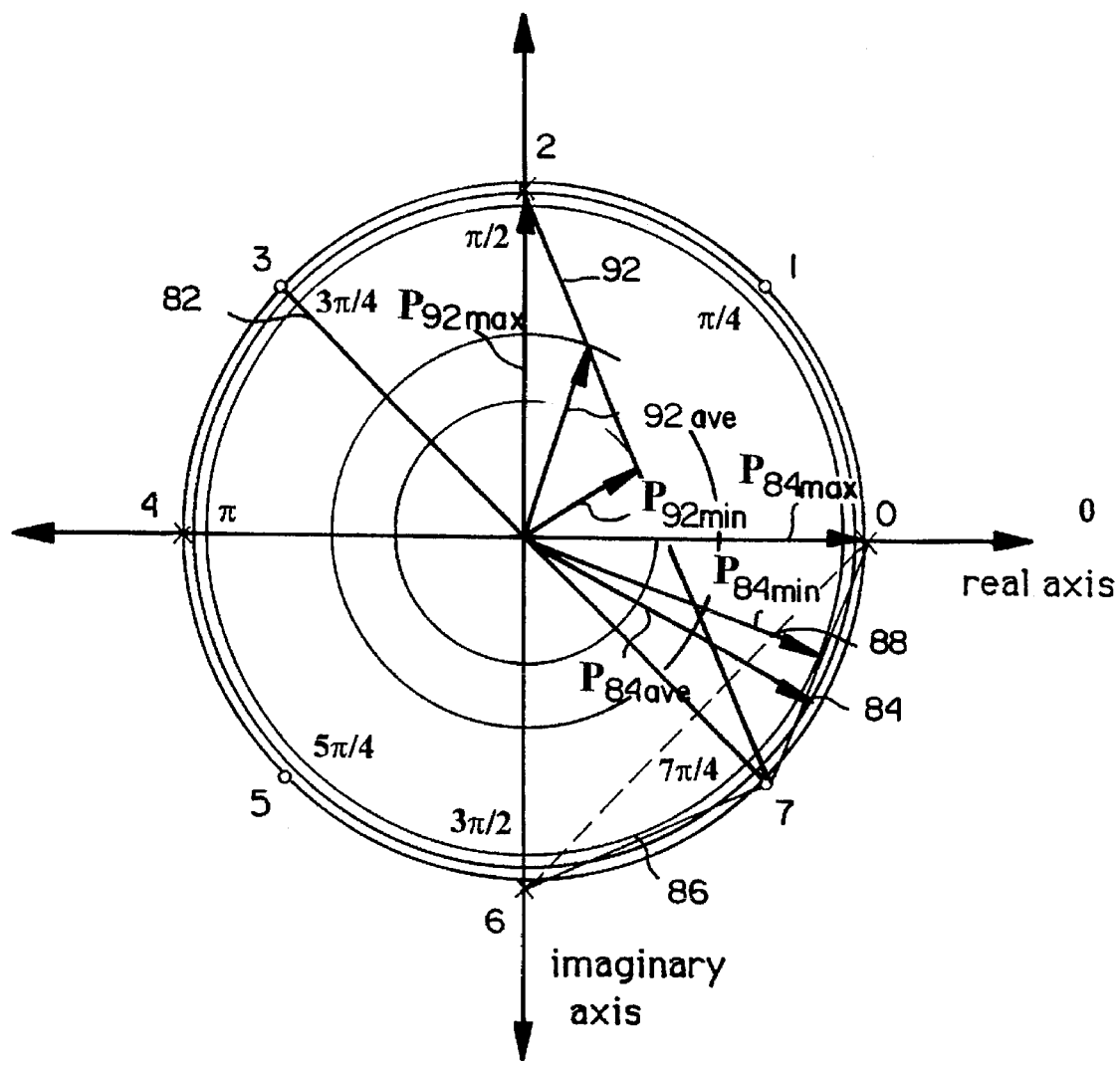
FIG. 3 is an illustration of an eight symbol signal constellation with theoretical symbol transitions superimposed upon it.

In conventional mappers, digital information to be transmitted, such as digitized speech, is encoded in symbols which are selected from a "constellation", such as the signal constellation shown in FIG. 3. The constellation has eight signal states indicated by symbols 0 through 7. Each symbol is represented by a phase angle and magnitude (being the distance from the center of the constellation) associated with it. If the last symbol sent by a transmitter was symbol 7, the phase angle is currently at 7π/4 radians. If the next symbol to be sent is symbol 3, the phase angle must change by π radians in the amount of time allocated for the next symbol ($T_S$). Since the period allocated for each transition from one symbol to the next is fixed at $T_S$, the change in phase angle with respect to time (dθ/dt) is dependent upon the difference of phase angles from one symbol to the next transmitted symbol since:

$$f = \frac{d\theta}{dt} \quad (1)$$

The change in phase angle θ with respect to time t determines the frequency requirements and power envelope variations of a transmitted signal. If large phase angle changes, such as transition 92, are allowed, the power variation is very large. The power is indicated by the distance from the center of the constellation to any point on a transition path. For transition 92, the minimum transmitted power is indicated as $P_{92min}$, with the maximum and average transmitted power being $P_{92max}$ and $P_{92ave}$, respectively. For a smaller transition 84, the maximum transmitted power is the same, but the minimum and average transmitted power, $P_{84min}$, $P_{84ave}$, respectively, are much closer to the maximum transmitted power $P_{84max}$.

By eliminating large phase angle transitions, such as transitions 82 and 92, and only allowing small transitions such as 84, 86 and 88, the power variation and the frequency spectrum of the transmitter may be narrowed. A signal constellation must be used which has a number of extra symbols over the number of symbols intended to be transmitted. This allows encoding of a number of symbols, while avoiding phase angle transitions which would result in a larger envelope power variations.

Figure 4:
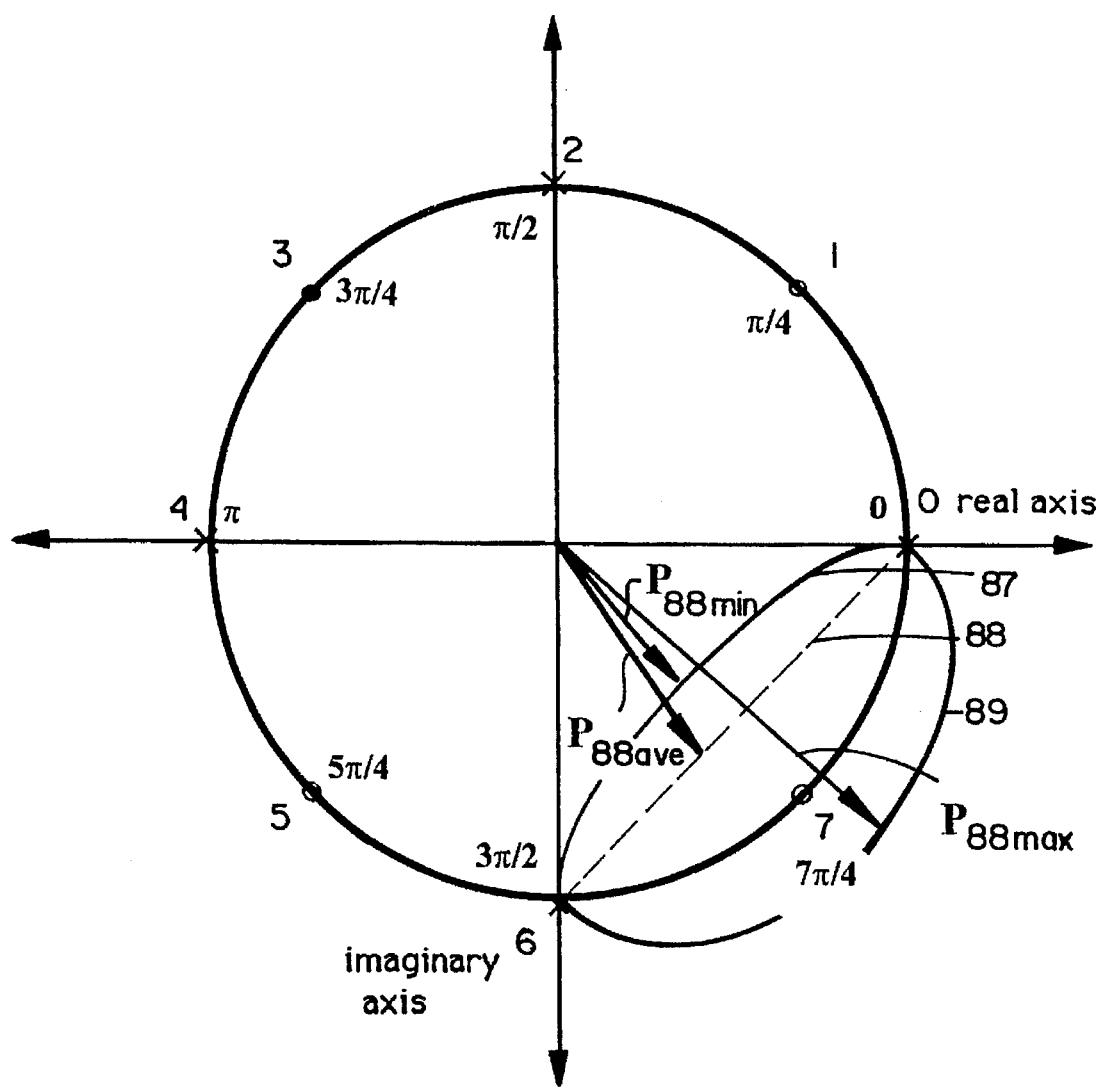
FIG. 4 is an illustration of the eight symbol signal constellation of FIG. 3 with actual symbol transitions superimposed upon it.

FIG. 4 illustrates a phase transition from symbol 6 to symbol 0 and vice versa. Theoretically, the transition from symbol 6 to symbol 0 should follow the dashed line 88. In real systems, however, a transition from symbol 6 to symbol 0 follows either a path 87 or a path 89. Paths 89 and 87 differ from path 88 due to the characteristics of the transmit filter 98 and mapper 96 of FIG. 2. The maximum power required for transition 89 is shown by arrow $P_{88max}$, the minimum power required is indicated by an arrow $P_{88min}$ and the average is $P_{88ave}$.

NEED FOR LINEARITY

Trellis codes typically correspond to a non-constant envelope and require the use of a linear power amplifier. In this situation it is desirable for the transmitted signal to have a small maximum-to-average transmitted power variation ($P_{max}/P_{ave}$). This reduces the operating region of the amplifier. The amplifier is now required to have a linear output in a smaller operating region, thereby reducing linearity requirements on the power amplifier. Further, for a given maximum transmitted power, a higher average power increases range for a specified bit error rate (BER).

Raising the maximum transmitted power causes both the average and the minimum transmitted power to increase. However, as the power increases, the life of the batteries of mobile units decreases. Therefore, it is desirable to increase the minimum transmitted power, and reduce the maximum transmitted power while maintaining an average transmitted power which will allow communications at a desired range.

Since a large variation in phase angle between adjacent symbols equates also to a large transmitted power variation, it would be beneficial to limit the phase angle transitions so as to limit the transmitted power variations, known as envelope variations.

ENCODER

Figure 5:
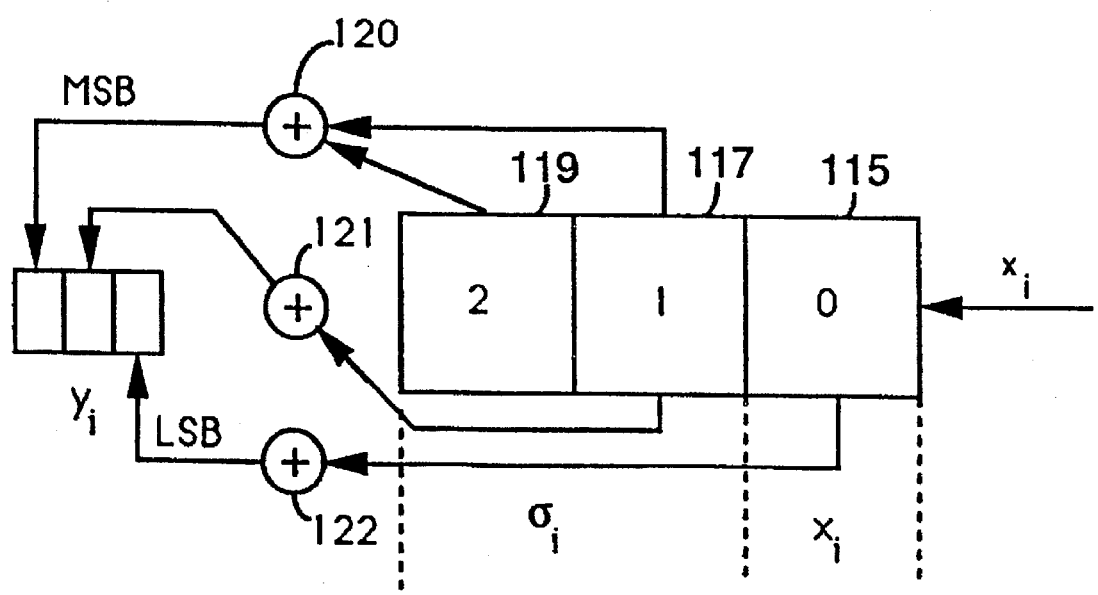
FIG. 5 is a block diagram of a Rate ⅓ convolutional encoder with memory length L=2 having three generator polynomials represented in octal notation as: (6, 2, 1).

FIG. 5 is a schematic diagram of an encoder which creates three output bits for each input bit $x_i$. This is known as a rate ⅓ encoder. The encoder has two memory registers 117, 119, each for holding a bit, and an input register 115 for receiving an input bit $x_i$. Registers in the encoder are numbered from right to left 0,1,2. A generator polynomial is a binary multiplier which selects the contents of registers and adds them modulo 2 to create an output bit. There is one generator polynomial for each output bit. For the encoder of FIG. 5 there are three generators. The first generator 120 adds the contents of registers 2 and 1 but not register 0. This generator is denoted by a binary 110 or an octal 6. The second generator 121 is represented by a binary 010 or octal 2, and the third generator 122 is represented by a binary 001 or an octal 1. In short notation the generator polynomial of FIG. 5 is (6,2,1). Registers 1 and 2 determine the state of the encoder, $\sigma_i$.

A linear shift register encoder is used only for illustrative purposes. The type of encoder employed in the present invention is not limited to linear shift register encoders or linear encoders. Many types of encoder which satisfy the present disclosure may be used.

The present invention transmits digital information information in differential phase angle symbols. The encoded output bits from the encoder are assigned to a symbol of each constellation. In the preferred embodiment the maximum phase angle change Θ should be chosen such that:

$$\Theta = [(2^l - 1)\pi]/k$$

where k is an integer and l is the number of encoded bits per transmitted symbol to result in 2k possible constellation symbols. Arbitrary choices of maximum phase angle change Θ may lead to an excessive number of possible constellation symbols, causing problems with equalization and coherent detection.

Figure 6:
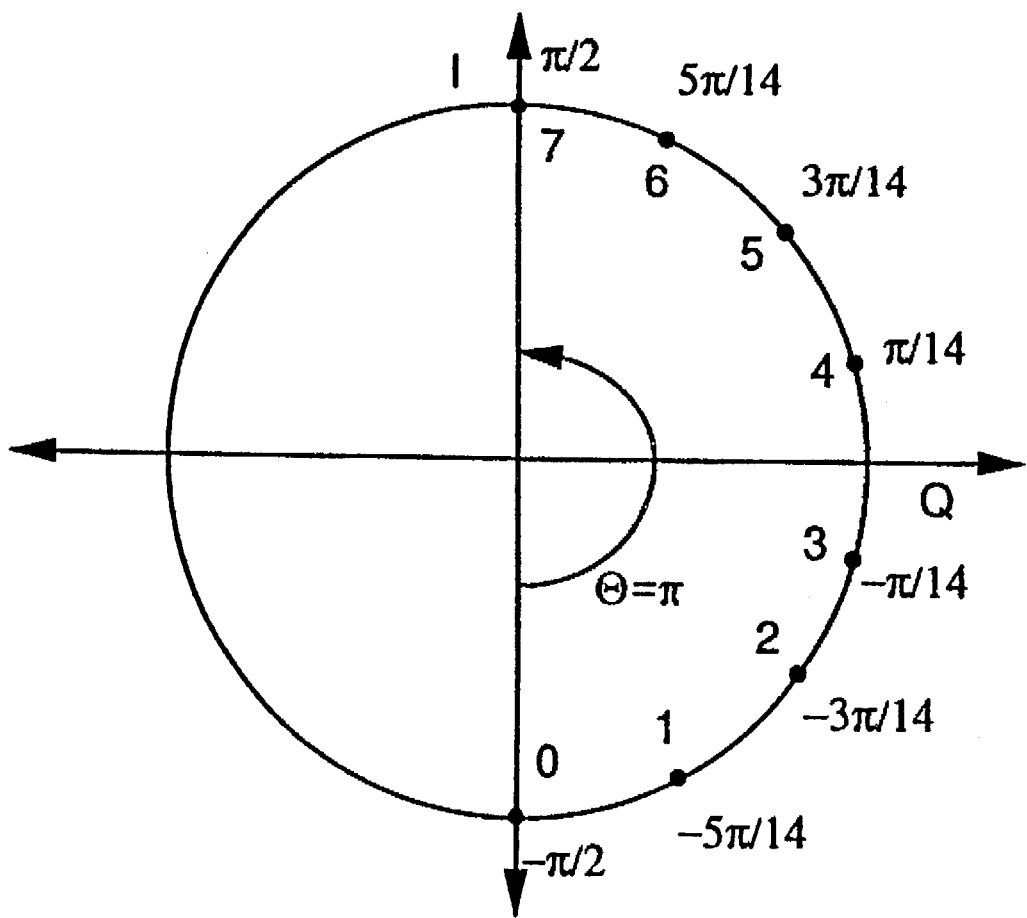
FIG. 6 is a diagram of a symbol constellation compatible with the present invention having a maximum transmitted phase angle constraint Θ of π/2.

For example, for the encoder of FIG. 5, there are 3 output bits or $2^{3=8}$ possible symbols. A maximum differential phase angle Θ=7π/k (where k is an integer) between subsequent transmitted symbols is chosen. The 8 symbols are evenly spaced within the chosen maximum differential phase angle Θ as shown in FIG. 6 has a value of k=14. The value of Θ determines the amount of allowable envelope variation. Lower values of Θ, simply lower envelope variation. The transmitted sequence s(n) is defined by:

$$s(n+1) = s(n)e^{j\phi(n)} \quad (2)$$

where n is the index of a time period in which the symbol is transmitted, φ(n) is a symbol phase angle. Since each symbol has redundancy bits for error detection and correction, at any symbol time, there are less symbols required than are available in the constellation.

MIMIMUM DISTANCE for AWGN

For an additive white Gaussian noise (AWGN) channel, the minimum separation between transmitted sequences, known as minimum Euclidian distance $d^2_{min}$, determines the amount of immunity the scheme has to interference. Larger separations between transmitted sequences imply that interference must be larger in order to lead to a wrong decision. Thus, a higher minimum Euclidian distance is preferred. The minimum distance between sequences, $d^2_{min}$, can be calculated as described by Biglieri et al. in "Introduction to Trellis Coded Modulation with Applications" published by MacMillan Publishing Co., New York, N.Y. 1991 at pages 527–539, hereby incorporated by reference.

Figure 7:
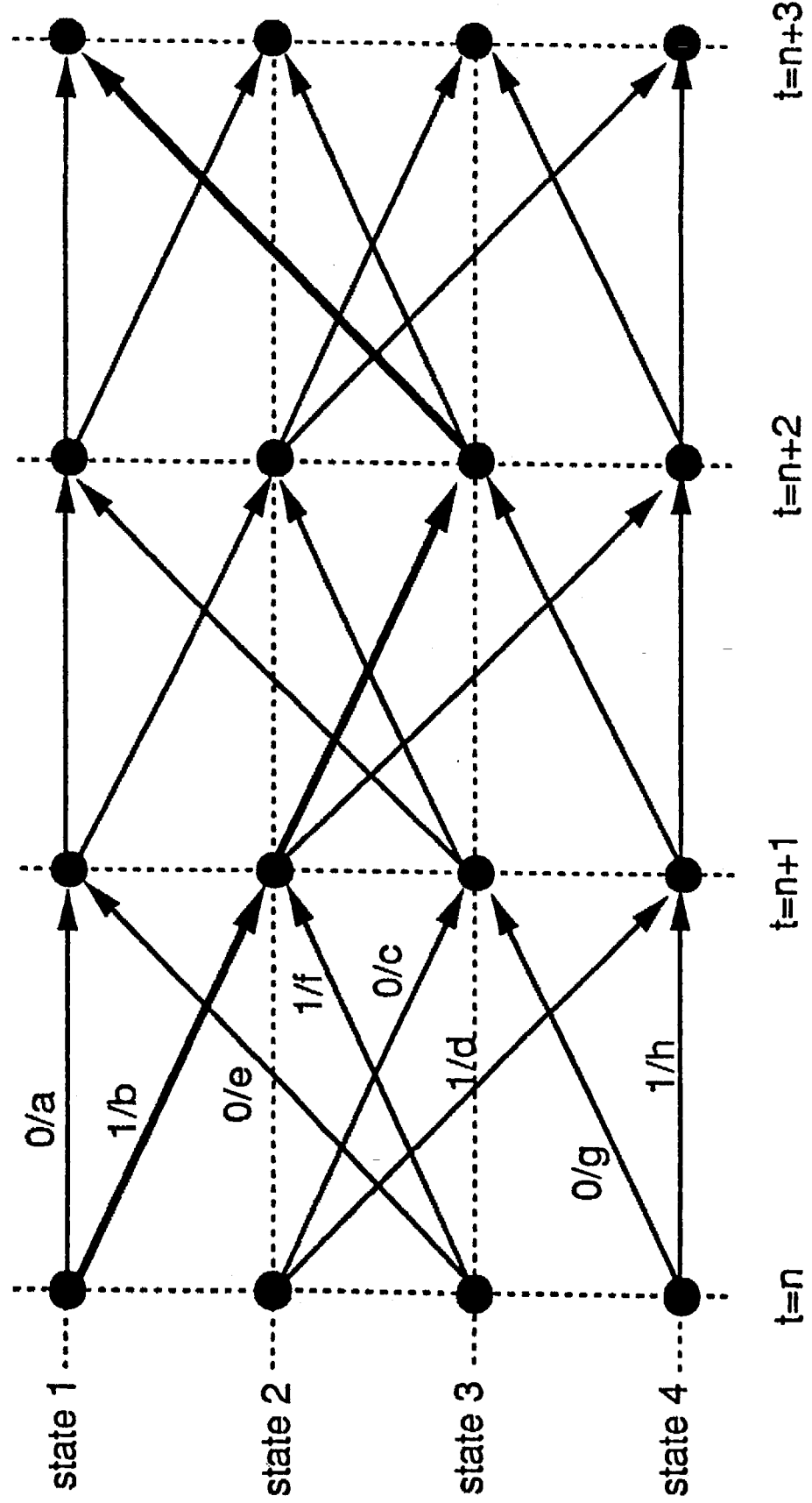
FIG. 7 is a trellis diagram illustrating state transitions of an encoder compatible with the present invention.

FIG. 7 is a graph of proposed encoder state transitions over a number of transmitted symbols periods, known as a trellis diagram, used in decoding the transmitted information in decoder 111 of FIG. 2. The trellis diagram is a simulation of the encoder states and their transitions as symbols are created and transmitted. Vertical nodes numbered "1", "2", "3" and "4" illustrate the states of encoder 94 of FIG. 2. Time progresses horizontally, with the first column of nodes pertaining to time t=n, the second column n at t=n+1 etc.

Starting at a given encoder state and symbol time, two input bits are possible, either 0 or 1. Each would cause a transition to a different encoder state and create a different output symbol. The terminology here shows the input bit a slash and the corresponding output symbol. In the trellis of FIG. 7, at a node defined by: t=n and an encoder state=1, an input bit of 0 produces a symbol a with no state change, denoted (0/a). An input bit of 1 at the same node creates a state change from state 1 to state 2 with a symbol b transmitted, denoted (1/b).

An iterative search is performed to determine the assignment of symbols of the above symbols to states changes for given input bits which maximize the minimum distance $d^2_{min}$ between transmitted symbol sequences as follows:

a) a generator polynomial is chosen;
b) each possible three bit encoder output sequence is assigned to a constellation symbol for all constellations;
c) all possible paths P through the trellis are permutated, and those paths which do not end on the same final state as the initial state are discarded with the remaining paths being closed paths;
d) an accumulated Euclidian distance $d^2_{ij}$ is determined for all possible pairs of closed paths;
e) a minimum distance $d^2_{min}$ between two closest paths is determined and stored with the corresponding generator polynomial;
f) steps "c"–"e" are repeated with all possible generator polynomials; and
g) the generator polynomial corresponding to a maximum $d^2_{min}$ is employed in the encoder.

The accumulated Euclidian distance $d^2_{ij}$ is calculated as:

$$d^2_{ij} = \sum_{n=1}^{N} |s_n^i - s_n^j|^2 \quad (3)$$

where $S^i_n - S^j_n$ is a distance (in the I,Q domain) between complex symbols from an nth symbol time period for closed paths $P_i$ and $P_j$, respectively, where i≠j, and N is the total number of symbols transmitted for each path.

For a fading channel, the criteria for choosing an optimum coding scheme differ from that of an AWGN channel described above. In addition, the transmitted symbols should be interleaved in order to achieve a good bit error rate (BER) performance in a fading channel. A more detailed discussion is provided in Biglieri p. 399–401. The BER is reduced because the interleaving breaks up the effect of the fades.

The present invention is advantageous since interleaving does not change the maximum phase angle transition from one transmitted symbol to the next and thus preserves the intended low transmitted power envelope variations.

For fading channels, a Hamming distance $d^2_{Hij}$ between all possible pairs of closed paths ($P_i$, $P_j$) where i≠j, is calculated. The Hamming distance is simply a count of the number of symbol transitions which differ between two paths. This may be stated as:

count of occurrences where $S^i_n \neq S^j_n$ for n=1,2,3, ... N, where $S^i_n$ is the symbol transmitted at an nth time period for path $P_i$, $S^j_n$ is the symbol transmitted at the nth time period for path $P_j$, and N is the total number of symbols transmitted for each path.

The minimum Hamming distance is determined for all possible generator polynomials. Since many generator polynomials may result in the same largest minimum Hamming distance $D^2_{Hmin}$, and only one generator polynomial may be used at a given time, one must be selected to configure the encoder.

The encoder is then configured, either by hardwiring, or programming, to employ the chosen generator polynomial in encoding subsequent data to result in a transmitted signal having reduced envelope variation and maximum distance between subsequent transmitted symbols.

In the case where more than one generator polynomial has been identified which is associated with the largest minimum Hamming distance $D^2_{Hmin}$, these paths, referred to as Hamming paths $P_H$, are processed further. A product distance $d^2_{prod:ij}$ is calculated between all possible pairs of Hamming paths ($P_{Hi}$, $P_{Hj}$) where i≠j is calculated by:

$$d^2_{prod:ij} = \prod_{n=1}^{N} |s_n^i - s_n^j|^2 \quad (4)$$

where the product is taken only for n such that $S^i_n - S^j_n$ and $S^i_n - S^j_n$ is a distance between complex symbols from an nth symbol time period for remaining Hamming paths $P_{Hi}$ and $P_{Hj}$, respectively, having largest minimum Hamming distance $D^2_{Hmin}$, and N is the total number of symbols transmitted for each path. A minimum product distance $d^2_{prod:min}$ being the lowest values of $d^2_{prod:ij}$ between pairs of Hamming paths is then determined. The minimum product distance $d^2_{prod:min}$ for all remaining generator polynomials is determined. The generator polynomial associated with a largest value of the minimum product distance $d^2_{prod:min}$ is then used to configure the encoder, resulting in a transmitted signal exhibiting reduced transmitted power envelope variations while retaining the transmitted range.

Figure 8:
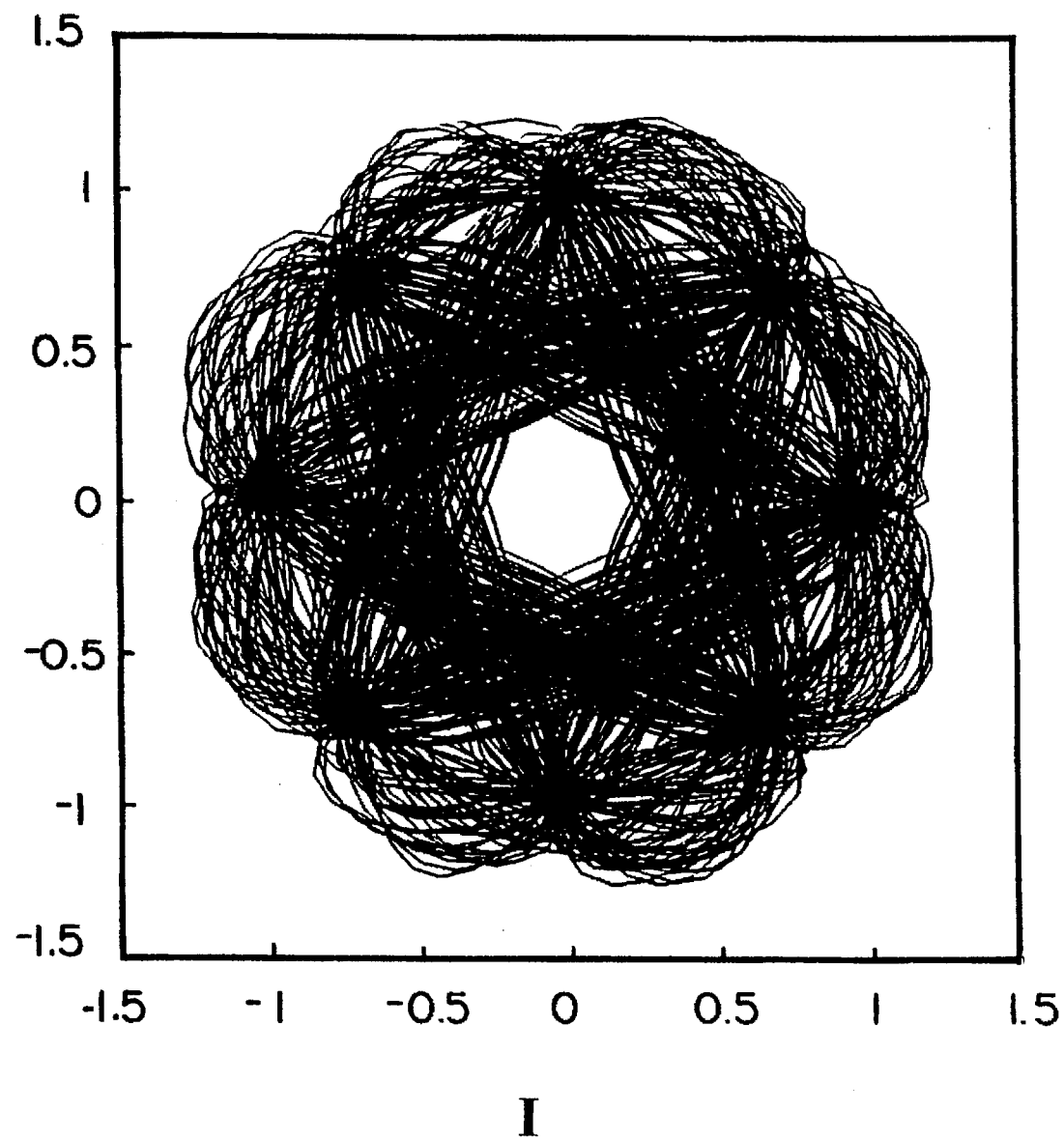
FIG. 8 is a graph of the power envelope variations for π/4-shifted DQPSK.
Figure 9:
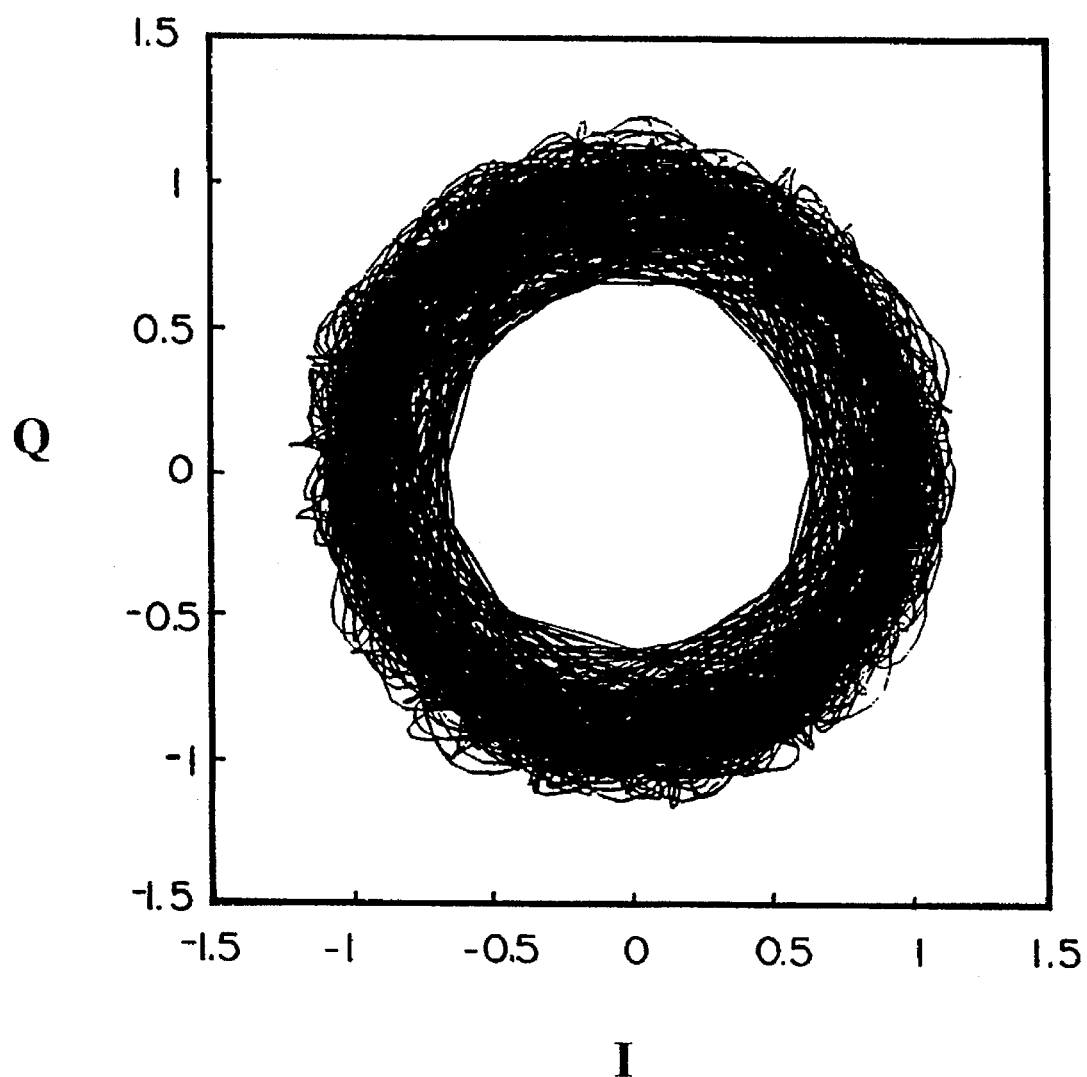
FIG. 9 is a graph of power envelope variations for a modulation scheme compatible with a first embodiment of the present invention.

As mentioned above, the RF power amplifier in the transmitter has a nonlinear response, and, in order to keep spectral splatter into other channels low, it is desirable to have low envelope variations in the transmitted signal. The modulation scheme of the present invention was chosen to achieve low envelope variations in the transmitted signal. The envelope variations for π/4-shifted DQPSK and those obtained using the proposed modulation scheme are shown in FIGS. 8 and 9, respectively. The envelope variations are plotted in terms of an I-Q plot which illustrates the amplitude of the I signal versus the amplitude of the Q signal (both of which vary with time). It should be noted that the I and Q signals shown in FIGS. 8 and 9 correspond to the I and Q signals after low-pass filtering as shown in FIG. 2. The vector sum of the I and the Q components gives the value of the envelope at any time. Thus, the distance of a point on the I-Q plot from the origin gives the value of the envelope. The I-Q plot, therefore, displays the range of envelope variations of the transmitted signal. From the I-Q plots shown it is clear that the proposed modulation scheme exhibits considerable lower envelope variations than π/4-shifted DQPSK.

Figure 10:
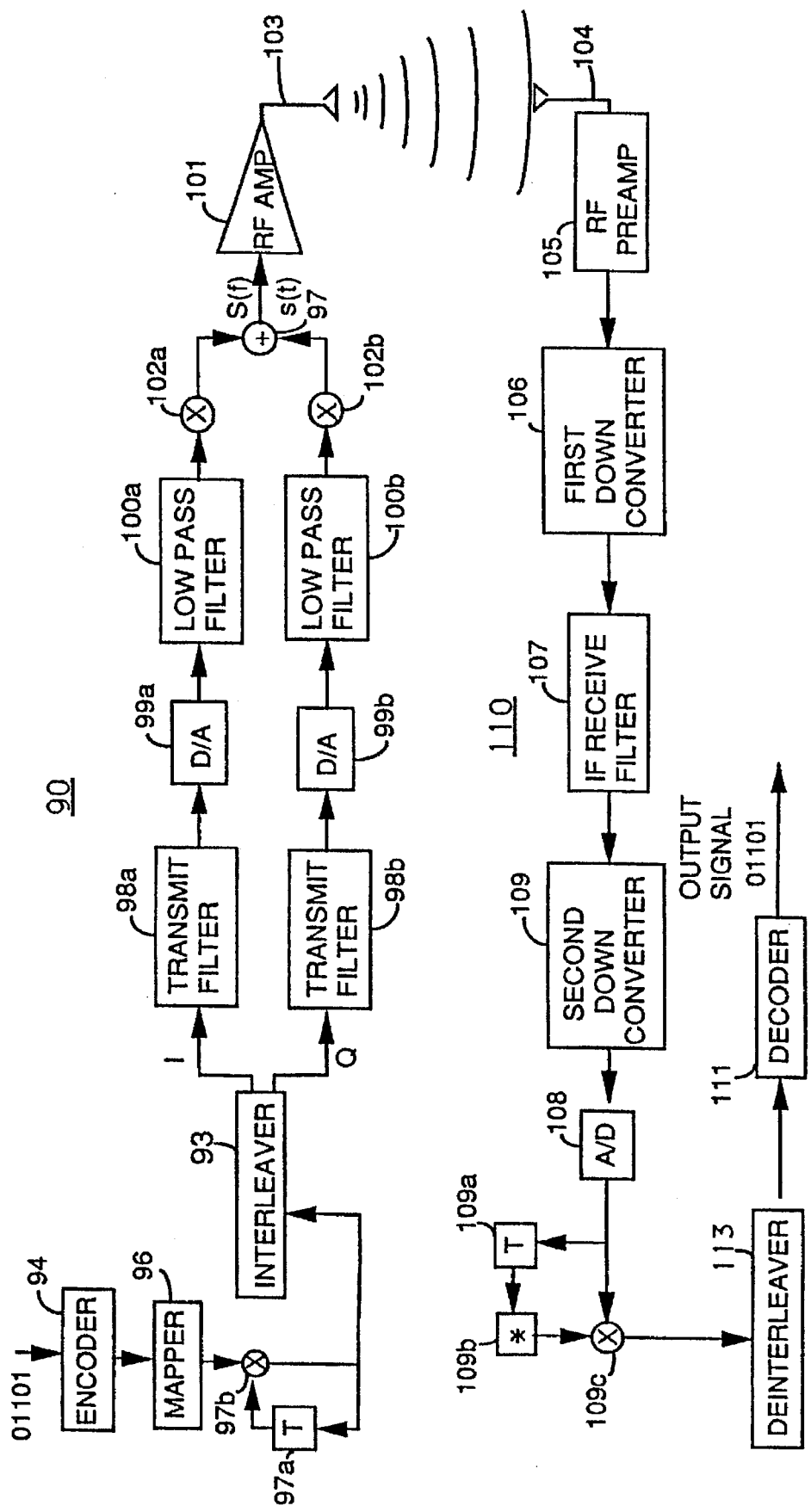
FIG. 10 is a simplified block diagram of a transmitter and receiver compatible with a second embodiment of the coding scheme of the present invention.

FIG. 10 illustrates an embodiment of the present invention which employs interleaving of data before transmission. Data intended to be transmitted is not taken in its original order as is the case with the apparatus of FIG. 2, but is shuffled before transmission by an interleaver 93. As the data is transmitted a "fade" being a loss in signal for a short period of time, causes information transmitted during that period to be corrupted. When the signal is received by receiver 110, it is demodulated and deinterleaved by a deinterleaver 113 which reshuffles the data back into the original order. Now the corrupted information is scattered throughout the signal sparsely. Error detection and correction schemes may then restore many of these corrupted bits. Since these schemes may only correct several bits provided that there are enough uncorrupted bits, they will not function without interleaving during fades.

Figure 11:
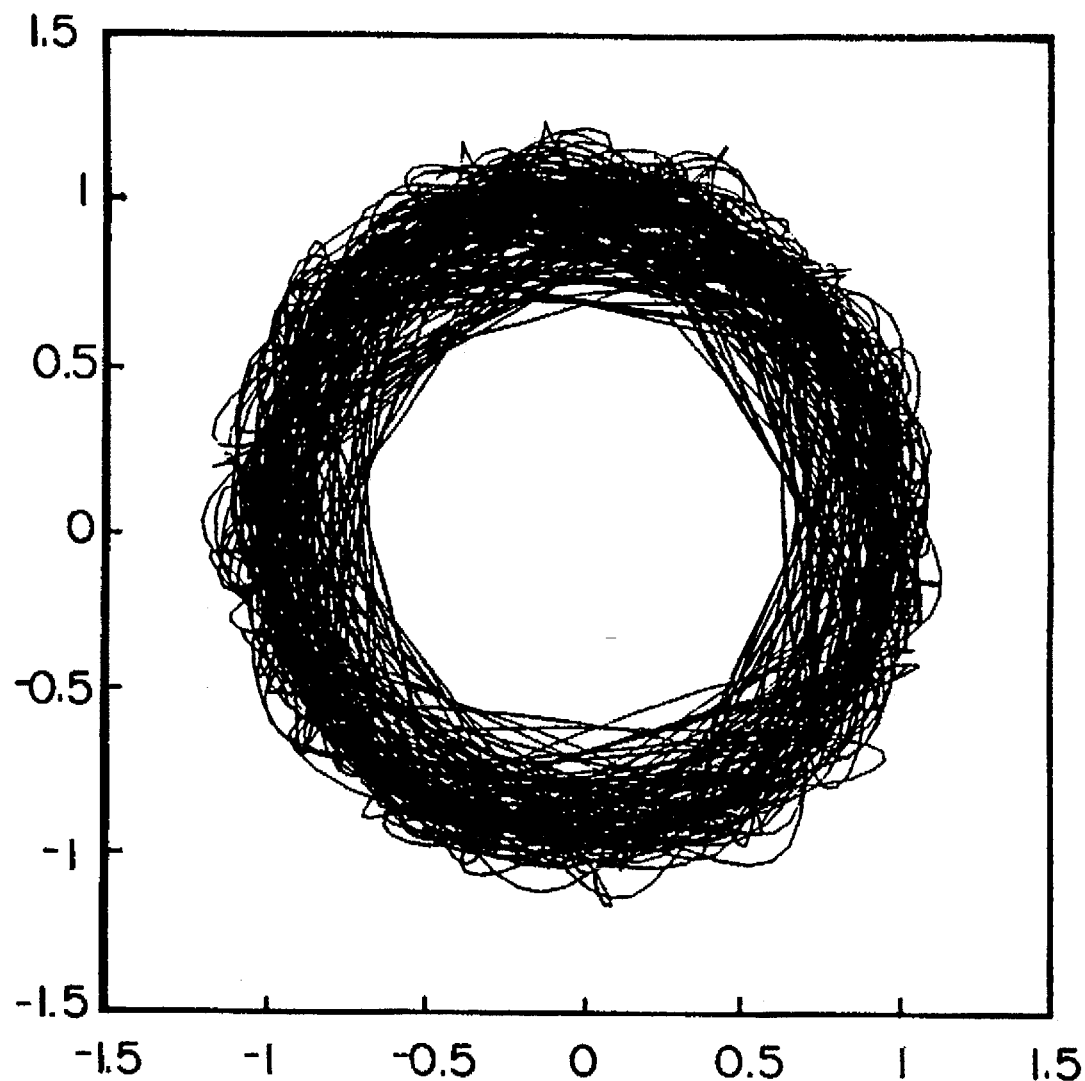
FIG. 11 is a graph of power envelope variations for a modulation scheme compatible with a second embodiment of the present invention.

The I vs. Q transmitted signal power plot for the apparatus of FIG. 10 employing the coding scheme of the present invention is shown in FIG. 11. The transmitted power envelope variations are similar to the plot of FIG. 9 which does not employ interleaving. Therefore the coding scheme of the present invention may be used in combination with interleaving without significant change in transmitted power envelope variation allowing it to be applied to fading channels.

The proposed modulation scheme achieves low envelope variations by restricting the maximum phase changes while choosing transmitted symbol sequences to achieve optimal BER performance.

Although described for LMR channels, the invention described herein is equally applicable to other digital radio systems.

While several presently preferred embodiments of the invention have been described in detail herein, many modifications and variations will now become apparent to those skilled in the art. It is, therefore, to be understood that the appended claims are intended to cover all such modifications and variations as fall within the true spirit of the invention.

What we claim is:

1. A method of configuring a digital radio transmitter having a encoder and mapper to transmit in an additive white Gaussian noise (AWGN) channel comprising the steps of:

a) selecting an encoder capable of being in a plurality of encoder states, the encoder capable of providing a set of 1 encoded bits for each set of input bits;

b) selecting a maximum constrained angle Θ being a maximum allowable phase angle transition for a symbol transmission;

c) selecting a set of constellation symbols within the maximum constrained angle Θ;

d) assigning each possible set of encoder bits to a desired constellation symbol;

e) adapting said mapper to provide a symbol assigned to a set of encoder bits, when provided therewith;

f) selecting a generator polynomial for said encoder;

g) determining all possible closed paths $P_i$, where a closed path is a set of encoder state transitions over time each associated with a symbol, and which have the same initial and final state;

h) determining an accumulated Euclidian distance $d^2_{ij}$ between all possible pairs of closed paths ($P_i$, $P_j$) where i≠j;

i) determining a minimum accumulated Euclidian distance $d^2_{min}$ being the lowest value of $d^2_{ij}$ between any two closed paths;

j) repeating steps "g" through "i" for all possible generator polynomials;

k) determining a largest minimum accumulated distance $D^2_{min}$ being the largest value of $d^2_{min}$; and l) adapting the encoder to employ the generator polynomial associated with the largest minimum accumulated distance $D^2_{min}$ in encoding subsequent data to result in a transmitted signal having reduced envelope variation and maximum distance between subsequent transmitted symbols.

2. The method of configuring a digital radio transmitter of claim 1 wherein the accumulated Euclidian distance $d^2_{ij}$ is calculated as:

$$d^2_{ij} = \sum_{n=1}^{N} |s_n^i - s_n^j|^2$$

where $S^i_n - S^j_n$ is a distance between complex symbols from an nth symbol time period for paths $P_i$ and $P_j$, respectively, and N is the total number of symbols transmitted for each path.

3. A method of configuring a digital radio transmitter having a encoder and mapper to transmit in a fading channel comprising the steps of:

a) selecting an encoder capable of being in a plurality of encoder states, the encoder capable of providing a set of encoded bits for each set of input bits;

b) selecting a maximum constrained angle Θ (in radians) according to:

$$\Theta = \frac{(2^l - 1)\pi}{k}$$

where k is a positive integer and l is the number of encoded bits, Θ being a maximum allowable phase angle transition for a symbol transmission;

c) selecting a set of constellation symbols within the maximum constrained angle Θ which is less than π radians;

d) assigning each possible set of encoder bits to a desired constellation symbol;

e) adapting said mapper to provide a symbol assigned to a set of encoder bits, when provided therewith;

f) selecting a generator polynomial for said encoder;

g) determining all possible closed paths $P_i$, where a closed path is a set of encoder state transitions over time each associated with a symbol, and which have the same initial and final state;

h) determining a Hamming distance $d^2_{Hij}$ between all possible pairs of closed paths ($P_i$, $P_j$) where i≠j;

i) determining a minimum Hamming distance $d^2_{Hmin}$ being the lowest values of $d^2_{Hij}$ between pairs of closed paths;

j) repeating steps "g" through "i" for all possible generator polynomials;

k) determining generator polynomials having a largest minimum Hamming distance $D^2_{Hmin}$ being the largest value of $d^2_{Hmin}$;

l) choosing a generator polynomial having the largest minimum Hamming distance $D^2_{Hmin}$; and l) adapting the encoder to employ the chosen generator polynomial in encoding subsequent data to result in a transmitted signal having reduced envelope variation and maximum distance between subsequent transmitted symbols.

4. The method of configuring a digital radio transmitter of claim 3 wherein the maximum constrained angle Θ with l=3 and the maximum constrained angle Θ thereby being defined by:

$$\Theta = 7\pi/k \text{ radians}$$

which k is integer to result in 2k total constellation symbols.

5. The method of configuring a digital radio transmitter of claim 3 wherein the Hamming distance $d^2_{Hij}$ is the count of occurrences where $S^i_n \neq S^j_n$ for n=1,2,3, ... N, where $S^i_n$ is the symbol transmitted at an nth time period for path $P_i$, $S^j_n$ is the symbol transmitted at the nth time period for path $P_j$, and N is the total number of symbols transmitted for each path.

6. The method of configuring a digital radio transmitter of claim 3 wherein the step of choosing choosing a generator polynomial comprises the steps of:

a) selecting a generator polynomial from those associated with the largest minimum Hamming distance $D^2_{Hmin}$;

b) selecting the Hamming paths $P_H$ each having the largest minimum Hamming distance $D^2_{Hmin}$;

c) determining a product distance $d^2_{prod:ij}$ between all possible pairs of Hamming paths ($P_{Hi}$, $P_{Hj}$) where i≠j;

d) determining a minimum product distance $d^2_{prod:min}$ being the lowest values of $d^2_{prod:ij}$ between pairs of Hamming paths;

e) repeating steps "b" through "d" for all remaining generator polynomials associated with a largest minimum Hamming distance $D^2_{Hmin}$; and f) choosing a generator polynomial associated with a largest value of the minimum product distance $d^2_{prod:min}$.

7. The method of configuring a digital radio transmitter of claim 6 wherein the product distance $d^2_{prod:ij}$ is calculated as:

$$d^2_{prod:ij} = \prod_{n=1}^{N} |s_n^i - s_n^j|^2$$

where the product is taken for n such that $S^i_n \neq S^j_n$ and $S^i_n - S^j_n$ is a distance between complex symbols from an nth symbol time period for remaining Hamming paths $P_{Hi}$ and $P_{Hj}$, respectively, and N is the total number of symbols transmitted for each path.

8. A method of communicating digital information over a radio channel, comprising:

(a) encoding sequences of data bits for transmission into differential phase angles constrained by a maximum differential phase angle based on a number L−1 of previous sequences of data bits where L is an integer;

(b) accumulating said differential phase angles to produce a sequence of absolute phase angles;

(c) forming I and Q sequences by calculating the cosine and sine of said absolute phase angles and filtering the sequences;

(d) digital-to-analog converting said filtered sequences to produce I and Q waveforms; and (e) modulating a radio frequency carrier with said I and Q waveforms using a quadrature modulator and transmitting the modulated carrier.

9. A method of communicating digital information according to claim 8, further comprising the steps of:

(a) receiving said modulated carrier using a radio receiver and forming a sequence of representative complex number samples using complex analog-to-digital converters; and (b) processing said complex samples using a decoder to recover said digital information, said decoder determining the most likely transmitted phase angle sequence from among only the phase angle sequences that can be produced by said encoder.

10. A method of configuring a digital radio transmitter including an encoder for producing an encoded set of bits for each set of input bits and a mapper for mapping encoded bits to differential phase of a signal constellation comprising the steps of:

(a) selecting a set of differential phase angles in the signal constellation complying with a maximum differential phase angle other than 3π/4, and (b) assigning each of the selected differential phase angles to a set of encoded bits to optimize a bit error rate of transmitted symbols based on a type of communications channel over which the transmitter transmits.

11. The method of configuring a digital radio transmitter of claim 10, wherein the maximum differential phase angle is less than 3π/4.

12. A method of configuring a digital radio transmitter including an encoder for producing an encoded set of bits for each set of input bits and a mapper for mapping encoded bits to a differential phase angle symbol of a signal constellation comprising the steps of:

selecting a set of constellation symbols corresponding to differential phase angles in the signal constellation to comply with a maximum phase angle constraint between selected symbols, and assigning each of the selected differential phase angle symbols to a set of encoded bits so as to optimize a separation distance between transmitted symbols and thereby improve immunity of the transmitted symbols to interference.

13. The method of configuring a digital radio transmitter of claim 12, wherein the optimal separation distance is a largest minimum separation distance between transmitted symbols.

14. The method of configuring a digital radio transmitter of claim 12, wherein the separation distance is optimized according to the following steps:

(a) selecting a generator polynomial for said encoder where the generator polynomial defines a corresponding state diagram with proposed encoder state transitions over plural transmitted symbol periods;

(b) determining closed paths between possible paths through the corresponding state diagram, where a closed path is a set of encoder state transitions over each symbol period having a same initial and final state;

(c) determining a minimum separation distance between different closed paths;

(d) repeating steps (a) through (c) for all possible generator polynomials; and (e) determining a largest minimum separation distance from minimum separation distances determined in step (c); and (f) selecting a generator polynomial corresponding to the largest minimum separation distance.

15. The method of configuring a digital radio transmitter of claim 14, where the separation distance in step (c) is an accumulated Euclidian distance $d^2_{ij}$ calculated as:

$$d^2_{ij} = \sum_{n=1}^{N} |s_n^i - s_n^j|^2$$

where $S^i_n - S^j_n$ is a distance in a complex domain between complex symbols from an n-th symbol for different closed paths and N is a total number of symbols transmitted for each path.

16. The method of configuring a digital radio transmitter of claim 14, wherein the separation distance between different closed paths is a Hamming distance corresponding to a number of occurrences where $S^i_n \neq S^j_n$ for n=1,2,3, ... N, where $S^i_n$ is the symbol transmitted at an n-th time period for path $P_i$, $S^j_n$ is the symbol transmitted at the nth time period for path $P_j$, and N is the total number of symbols transmitted for each path.

17. The method of configuring a digital radio transmitter of claim 12, wherein the predetermined phase angle constraint is a maximum phase angle transition and the set of constellation symbols is selected so that differential phase angle changes between selected symbols are within the maximum phase angles.

* * * * *